United States Patent
Lai et al.

(10) Patent No.: US 10,872,579 B2
(45) Date of Patent: Dec. 22, 2020

(54) METHOD FOR REDUCING OPERATING TEMPERATURE OF SOURCE DRIVING CIRCUIT AND DISPLAY SYSTEM

(71) Applicant: NOVATEK Microelectronics Corp., Hsin-Chu (TW)

(72) Inventors: Sheng-Wen Lai, Tainan (TW); Te-Hsien Kuo, Keelung (TW); Han-Kun Wu, Hsinchu (TW); Chin-Hung Hsu, Taoyuan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/402,212

(22) Filed: May 2, 2019

(65) Prior Publication Data

US 2019/0340993 A1 Nov. 7, 2019

Related U.S. Application Data

(60) Provisional application No. 62/666,656, filed on May 3, 2018.

(51) Int. Cl.
G09G 3/30 (2006.01)
G09G 3/36 (2006.01)
G02F 1/1333 (2006.01)

(52) U.S. Cl.
CPC ..... *G09G 3/3685* (2013.01); *G02F 1/133382* (2013.01); *G09G 3/3674* (2013.01); *G09G 3/3696* (2013.01); *G09G 2310/08* (2013.01); *G09G 2320/041* (2013.01); *G09G 2330/04* (2013.01); *G09G 2330/045* (2013.01); *G09G 2330/08* (2013.01); *G09G 2330/12* (2013.01)

(58) Field of Classification Search
None
See application file for complete search history.

(56) References Cited

U.S. PATENT DOCUMENTS

| | | | |
|---|---|---|---|
| 2011/0316823 A1* | 12/2011 | Otani | G09G 3/3688 345/204 |
| 2013/0241959 A1 | 9/2013 | Ge | |
| 2014/0375620 A1* | 12/2014 | Chen | G09G 3/20 345/212 |
| 2019/0237003 A1* | 8/2019 | Cao | G09G 3/2096 |

* cited by examiner

*Primary Examiner* — Joseph R Haley
(74) *Attorney, Agent, or Firm* — Winston Hsu (57) ABSTRACT

A method for reducing operating temperature of a source driving circuit and a display system are provided. The method for reducing operating temperature of a source driving circuit includes enabling an over-temperature protection operation by the source driving circuit; and transmitting, by the source driving circuit, a first signal to a timing controller in response to detecting a temperature increasing to be higher than the first threshold temperature, wherein the timing controller is configured to operate a temperature reducing operation in response to receiving the first signal.

6 Claims, 11 Drawing Sheets

L255 1H-stripe @1+2line inversion

| + L255 | − L255 | + L255 | − L255 |
|---|---|---|---|
| − L0 | + L0 | − L0 | + L0 |
| − L255 | + L255 | − L255 | + L255 |
| + L0 | − L0 | + L0 | − L0 |

FIG. 14

FIG. 15 ment of the invention.
METHOD FOR REDUCING OPERATING TEMPERATURE OF SOURCE DRIVING CIRCUIT AND DISPLAY SYSTEM

CROSS REFERENCE TO RELATED APPLICATIONS

This application claims the priority of U.S. Provisional Application No. 62/666,656, filed May 3, 2018, which is included herein by reference.

BACKGROUND OF THE INVENTION

1. Field of the Invention

The present invention relates to a method for reducing operating temperature of a source driving circuit and display system, and more particularly, to a method for reducing operating temperature of a source driving circuit and display system capable of decreasing device temperature.

2. Description of the Prior Art

An LCD device utilizes a source driver and a gate driver to drive pixels on a display panel to display image data. The LCD device now has higher resolutions and higher frame rate. Moreover, the size of a panel in an LCD device is getting larger to meet demands, which results in an increase in the number of pixels in the display panel. The large display device would consume more power for operation, and thus causing the temperature of internal device increases promptly. Further, the rising temperature will damage to the internal devices of the display device, thereby resulting in abnormal display situation. Thus, there is a need for improvement over the prior art.

SUMMARY OF THE INVENTION

It is therefore an objective of the present invention to provide a method for reducing operating temperature of a source driving circuit and display system to solve the abovementioned problem.

According to an embodiment of the present invention, a method for reducing operating temperature of a source driving circuit is provided. The method includes: enabling an over-temperature protection operation by the source driving circuit; and transmitting, by the source driving circuit, a first signal to a timing controller in response to detecting a temperature increasing to be higher than the first threshold temperature, wherein the timing controller is configured to operate a temperature reducing operation in response to receiving the first signal.

According to an embodiment of the present invention, a method for reducing operating temperature of a source driving circuit is provided. The method includes: enabling a pattern detection operation; and operating a temperature reducing operation in response to detecting a preconfigured pattern in a frame to be displayed.

According to an embodiment of the present invention, a display system is provided. The display system includes: a display panel; a source driving circuit, coupled to the display panel and comprising a first output node for outputting a first signal indicating an over-temperature detecting result; a gate driving circuit; and a timing controller, comprising a second output node for outputting a control signal which indicates the gate driving circuit is active or inactive; wherein the first output node is electrically connected to the second output node and the first signal is capable of pulling the control signal to an inactive voltage level in response to that the source driving circuit detects an operating temperature increasing to be higher than a first threshold temperature, such that the gate driving circuit becomes inactive.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
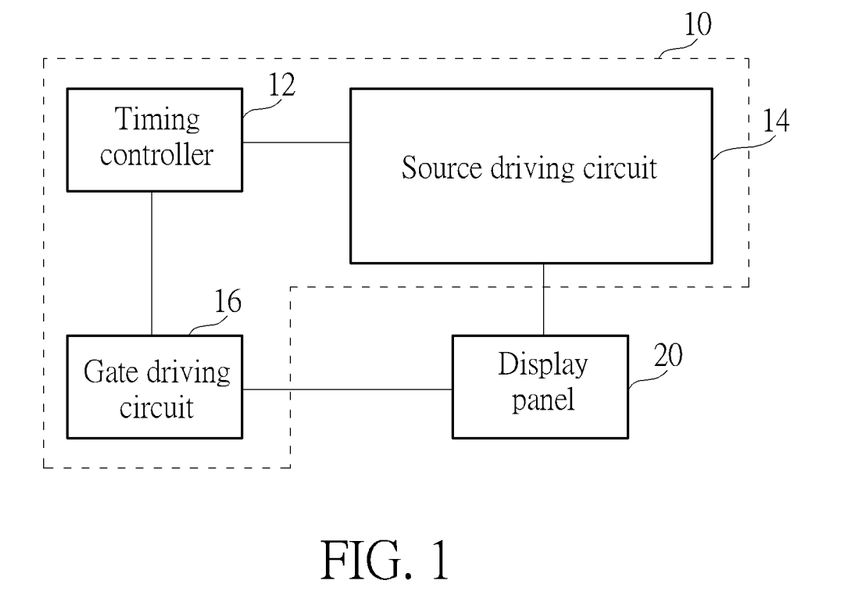
FIG. 1 is a schematic diagram of a display system according to an embodiment of the invention.

Please refer to FIG. 1, which is a schematic diagram of a display system 1 according to an embodiment of the invention. The display system 1 includes a driving device 10 and a display panel 20. The display system 1 may be an electronic device with a display panel (e.g., a liquid crystal panel), such as a television, a smart phone or a tablet. The driving device 10 is configured to drive the display panel 20 according to image data. The driving device 10 may be a semiconductor integrated circuit. The driving device 10 includes a timing controller 12, a source driving circuit 14 and a gate driving circuit 16. The timing controller 12 is coupled to the source driving circuit 14 and the gate driving circuit 16. The source driving circuit 14 includes a plurality of data output nodes configured to output data voltages corresponding to image data to drive pixels of the display panel 20 during a normal operation state. The data output nodes of the source driving circuit 14 are coupled to the display panel 20 via data lines.

The gate driving circuit 16 is configured to provide gate driving signals to turn on respective pixels of the display panel 20 via gate lines. The gate driving circuit 16 may be formed in a chip on film (COF) package, a gate on array (GOA) circuit or a gate on panel (GOP) circuit, but this should not be a limitation of the invention. The display panel 20 can be a liquid crystal display (LCD) panel, but not limited thereto. The display panel 20 may include a plurality of pixels, a plurality of data lines and a plurality of gate lines. The plurality of data lines may be coupled to the source driving circuit 14 for receiving data driving signals from the source driving circuit 14. The plurality of gate lines may be coupled to the gate driving circuit 16 for receiving gate driving signals from the gate driving circuit 16.

Figure 2:
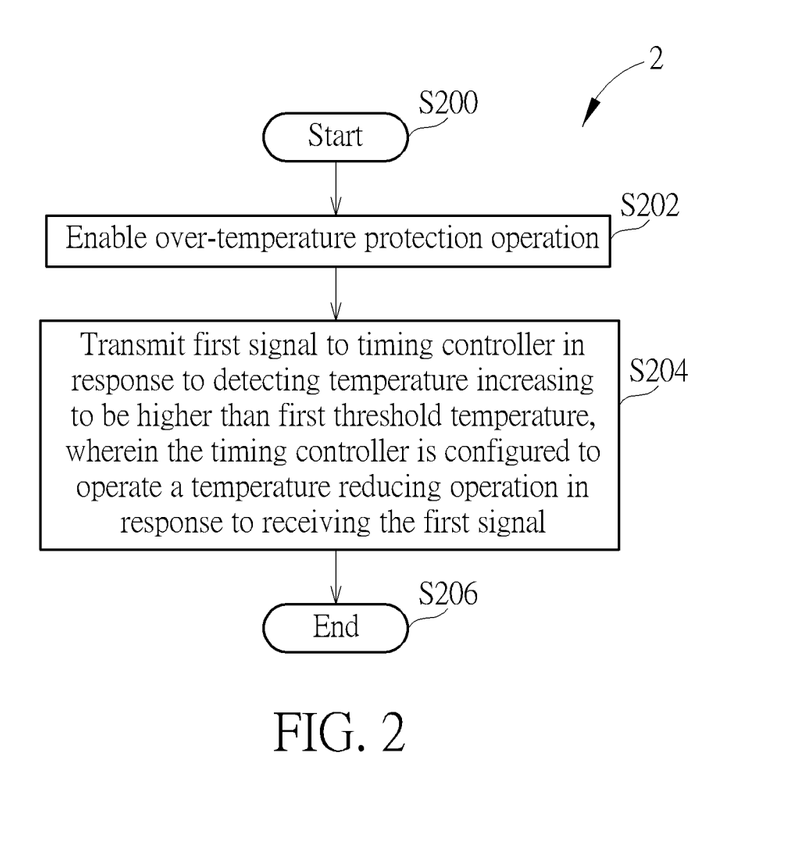
FIG. 2 is a flow diagram of a procedure according to an embodiment of the present invention.

Please refer to FIG. 2 which is a flow diagram of a procedure 2 according to an embodiment of the present invention. The procedure 2 can be applied to the display system 1 shown in FIG. 1. The procedure 2 at least includes the following steps:

Step S200: Start.

Step S202: Enable an over-temperature protection operation.

Step S204: Transmit a first signal to the timing controller 21 in response to detecting a temperature increasing to be higher than the first threshold temperature, wherein the timing controller is configured to operate a temperature reducing operation in response to receiving the first signal.

Step S206: End.

According to the procedure 2, in Step S202, the source driving circuit 14 can enable an over-temperature protection operation during operation. In addition, the timing controller 12 can transmit a command signal indicating activation of the over-temperature protection operation to the source driving circuit 14. After receiving the command signal, the source driving circuit 14 enables the over-temperature protection operation in response to receiving the command signal from the timing controller 12. When the over-temperature protection operation is enabled, the operating temperature of the source driving circuit 14 can be detected. For example, the source driving circuit 14 may be equipped with at least one temperature sensor for detecting the temperature of the source driving circuit 14. The temperature sensor may be a thermistor or a resistance temperature detector, and this should not be a limitation of the invention. The source driving circuit 14 can obtain information of the temperature of the source driving circuit 14 from the temperature sensor and compare the temperature of the source driving circuit 14 with a first threshold temperature. The source driving circuit 14 determines whether the temperature of the source driving circuit increases to be higher than the first threshold temperature.

In response to determining that the temperature of the source driving circuit increases to be high than the first threshold temperature, the source driving circuit 14 controls a plurality of data output nodes of the source driving circuit 14 to stay in a first state, thereby reducing the data output toggle, reducing the power consumption and decreasing the temperature of the source driving circuit 14. For example, the first state is a high impedance (hi-Z) state. In another example, the first state is data voltages of a currently displayed frame, which means the data voltages are not refreshed. In other words, each data output node of the source driving circuit 14 keeps the same voltage level as data voltages of the currently displayed frame, and thus reducing the data output toggle, reducing the power consumption and decreasing the temperature of the source driving circuit 14.

Moreover, the source driving circuit 14 can control the plurality of data output nodes of the source driving circuit 14 to stay in the first state for a preconfigured period, and the preconfigured period may starts from a frame period or a display line period next to detecting the temperature increasing to be higher than the first threshold. The source driving circuit 14 can control the plurality of data output nodes of the source driving circuit 14 to stay in the first state until a frame period or a display line period next to detecting the temperature decreasing to be lower than a second threshold temperature.

In Step S204, the source driving circuit 14 transmits a protection signal to the timing controller 12 so as to inform the timing controller 12 of activation or inactivation of the temperature reducing operation. When detecting that the temperature of the source driving circuit 14 increases to be higher than a first threshold temperature, the source driving circuit 14 transmits the protection signal indicating the activation of the temperature reducing operation to the timing controller 12. When detecting that the temperature of the source driving circuit 14 decreases to be lower than a second threshold temperature, the source driving circuit 14 transmits the protection signal indicating the inactivation of the temperature reducing operation to the timing controller 12.

Figure 3:
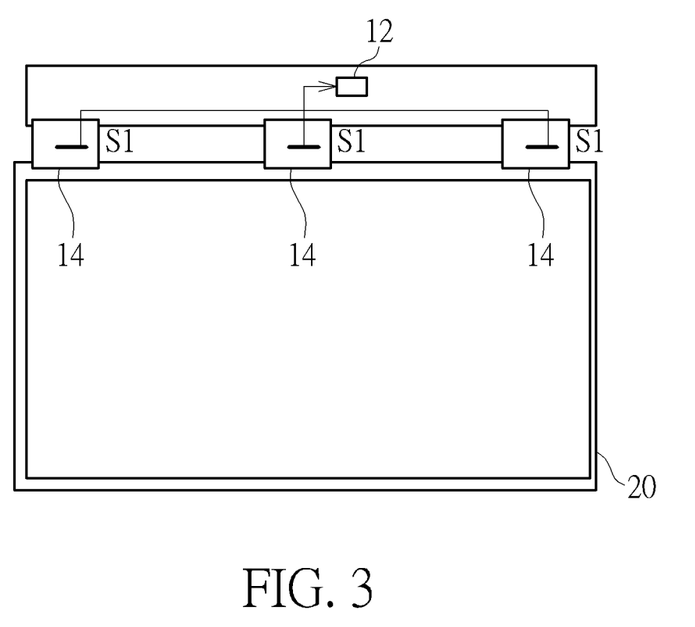
FIG. 3 is a schematic diagram illustrating the timing controller and the source driving circuit shown in FIG. 1 according to an embodiment of the invention.

For example, please refer FIG. 3. FIG. 3 is a schematic diagram illustrating the timing controller 12 and the source driving circuit 14 shown in FIG. 1 according to an embodiment of the invention. The source driving circuit 14 of FIG. 3 is formed as a COF package and utilizes a physical pin to transmit a temperature reduction control signal S1 indicating the activation or inactivation of the temperature reducing operation to the timing controller 12. When detecting that the temperature of the source driving circuit 14 rises to be higher than the first threshold temperature, the source driving circuit 14 utilizes the physical pin to transmit the temperature reduction control signal S1 indicating the activation of the temperature reducing operation to the timing controller 12. When detecting that the temperature of the source driving circuit 14 decreases to be lower than the second threshold temperature, the source driving circuit 14 utilizes the physical pin to transmit the temperature reduction control signal S1 indicating the inactivation of the temperature reducing operation to the timing controller 12. In addition, the source driving circuit 14 can also use any existing control signal or data signal between the timing controller 12 and the source driving circuit 14 for informing the timing controller 12 about activation or inactivation of the temperature reducing operation. For example, a clock ready detection (CRD) signal can be used as the temperature reduction control signal S1. In another example, a protection signal OTP out indicating an over-temperature detecting result can be used as the temperature reduction control signal S1.

The timing controller 12 receives the temperature reduction control signal S1 from the source driving circuit 14. In response to receiving the temperature reduction control signal S1, the timing controller 12 is configured to operate a temperature reducing operation. In one embodiment, the timing controller 12 controls the gate driving circuit 16 to not to output during a plurality of frame periods in response to receiving the temperature reduction control signal S1. For example, the timing controller 12 can control the gate driving circuit 16 to not to output during a plurality of frame periods by setting an output enable signal or agate clock signal to be inactive (i.e., to be at an inactive voltage level). In addition, in a period during which the gate driving circuit 16 does not output, the timing controller 12 can output a plurality of data of small swings to the source driving circuit 14, so as to reduce the power consumption and the temperature of the source driving circuit 14.

Figure 4:
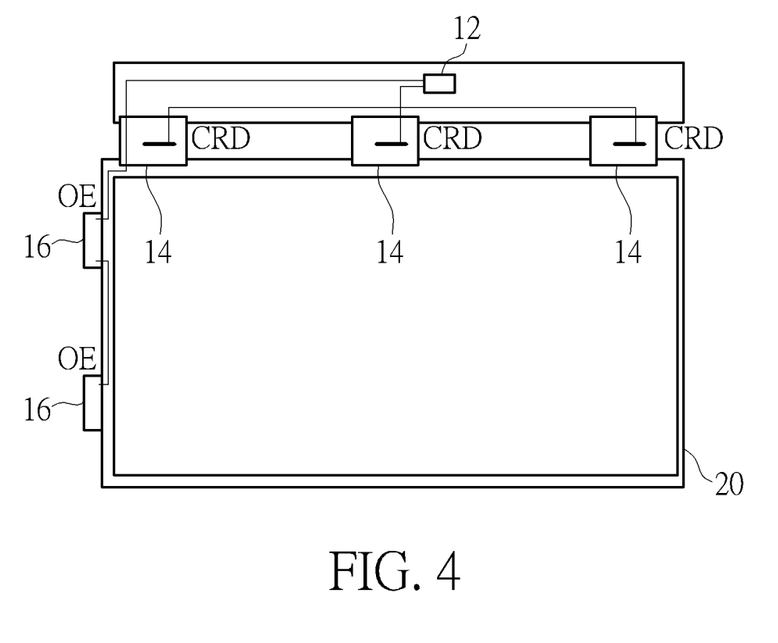
FIG. 4 is a schematic diagram illustrating the display system with the gate driving circuit in COF package according to an embodiment of the invention.
Figure 5:
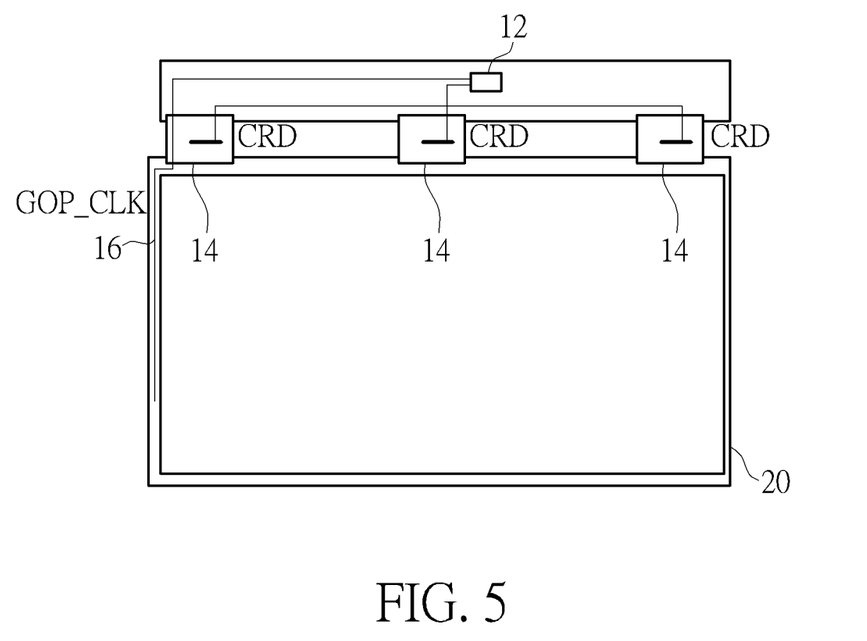
FIG. 5 is a schematic diagram illustrating the display system with the gate driving circuit as a GOA or COP circuit according to an embodiment of the invention.
Figure 6:
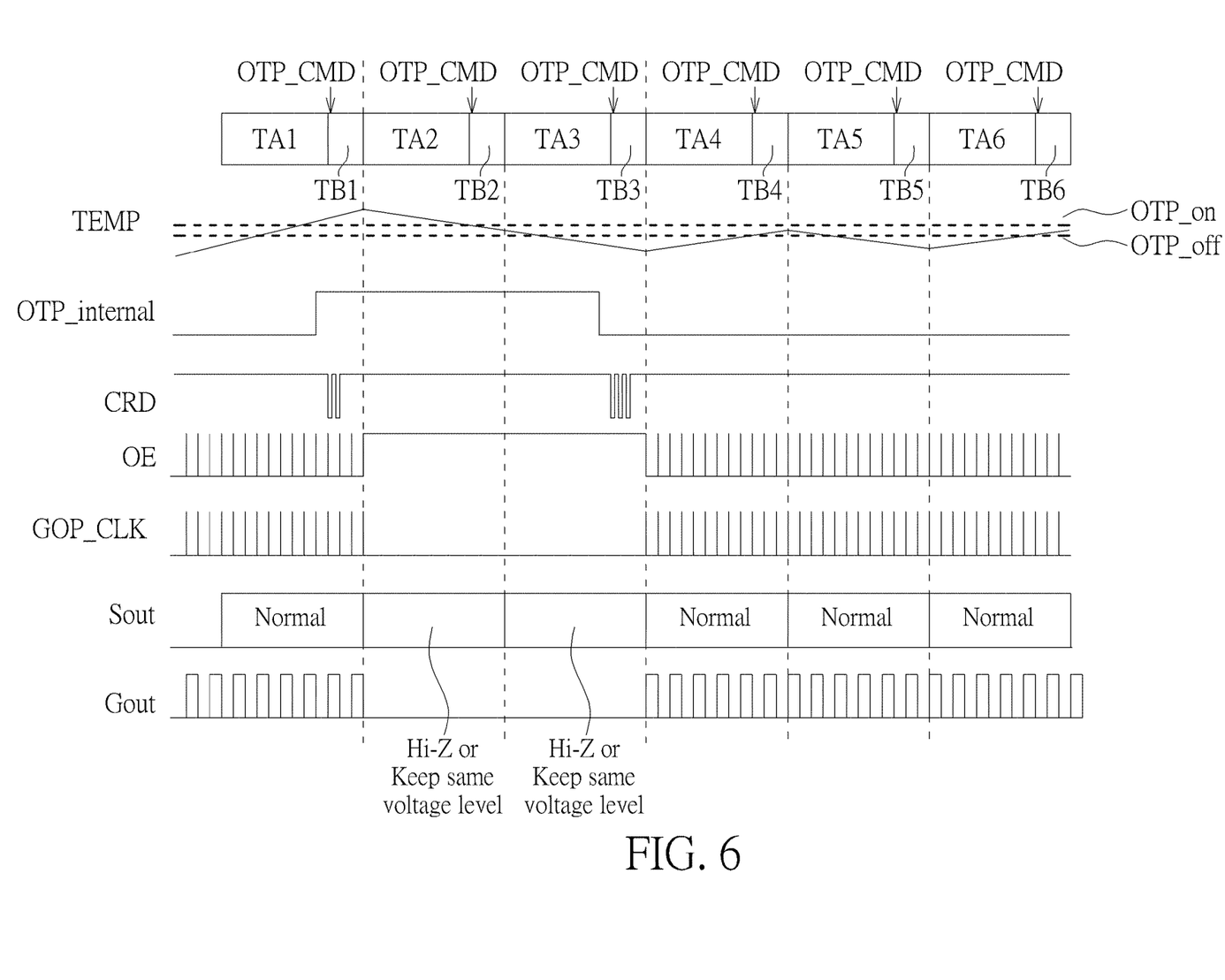
FIG. 6 is a waveform diagram of the display system shown in FIG. 1 and FIGS. 4-5 according to an embodiment of the invention.

Please refer FIG. 4 to FIG. 6. FIG. 4 shows the display system 1 with the gate driving circuit 16 in COF package. FIG. 5 shows the display system 1 with the gate driving circuit 16 as a GOA or COP circuit. FIG. 6 is a waveform diagram of the display system 1 shown in FIG. 1 and FIGS. 4-5 according to an embodiment of the invention. As shown in FIG. 6, the output enable signal OE is low active. That is, an active voltage level of the output enable signal OE is a low voltage level and an inactive voltage level of the output enable signal OE is a high voltage level. The gate driving circuit 16 shown in FIG. 4 can output when the output enable signal OE is at the low voltage level. The gate driving circuit 16 shown in FIG. 4 does not output when the output enable signal OE is at the high voltage level. As shown in FIG. 6, the gate clock signal GOP_CLK is high active. That is, an active voltage level of the gate clock signal GOP_CLK is a high voltage level and an inactive voltage level of the gate clock signal GOP_CLK is a low voltage level. The gate driving circuit 16 shown in FIG. 5 can output when the gate clock signal GOP_CLK is at the high voltage level. The gate driving circuits 16 shown in FIG. 5 does not output when the gate clock signal GOP_CLK is at the low voltage level.

As shown in FIG. 4 to FIG. 6, the timing controller 12 transmits an over-temperature protection command signal OTP_CMD to the source driving circuit 14 at the beginning of the blanking period TB1. In response to receiving the over-temperature protection command signal OTP_CMD, the source driving circuit 14 enables the over-temperature protection operation. During the blanking period TB1, the source driving circuit 14 detects that an operating temperature TEMP of the source driving circuit 14 increases to be higher than a first threshold temperature OTP_on. In response to detecting the temperature TEMP increasing to be higher than the first threshold temperature OTP_on, the source driving circuit 14 controls data output nodes of the source driving circuit 14 to stay in high impedance state or stay in data voltages of a currently displayed frame from the active display period TA2 to the blanking period TB3. In FIG. 6, Sout is the signal measured at the data output nodes of the source driving circuit 14.

In this embodiment, in response to detecting that the temperature increases to be higher than the first threshold temperature OTP_on, the source driving circuit 14 outputs the clock ready detection (CRD) signal with a twice toggle to the timing controller 12 in the blanking period TB1 for informing the timing controller 12 of activation of the temperature reducing operation. The CRD signal is used as the temperature reduction control signal S1 in FIG. 4.

In response to receiving the CRD signal with twice toggle, the timing controller 12 shown in FIG. 4 transmits the output enable signal OE at the high voltage level (i.e. inactive voltage level) to the gate driving circuit 16 shown in FIG. 4 during the active display periods TA2 and TA3, and the blanking periods TB2 and TB3. Therefore, since the output enable signal OE is at the high voltage level, the gate driving circuit 16 shown in FIG. 4 does not output during the active display periods TA2 and TA3, and the blanking periods TB2 and TB3. As shown in FIG. 6, the output Gout of the gate driving circuit 16 is pulled to low level and the gate driving circuit 16 shown in FIG. 4 does not drive the gate lines of the display panel 20 during the active display periods TA2 and TA3, and the blanking periods TB2 and TB3, thereby reducing the power consumption and decreasing the temperature of the gate driving circuit 16.

Similarly, in response to receiving the CRD signal with twice toggle, the timing controller 12 shown in FIG. 5 transmits the gate clock signal GOP_CLK at the low voltage level (i.e. inactive voltage level) to the gate driving circuit 16 shown in FIG. 5 during the active display periods TA2 and TA3, and the blanking periods TB2 and TB3. In this example, the Therefore, since the gate clock signal GOP_CLK is at the low voltage level, the gate driving circuit 16 shown in FIG. 5 does not output during the active display periods TA2 and TA3, and the blanking periods TB2 and TB3. As shown in FIG. 6, the output Gout of the gate driving circuit 16 is pulled to low level and the gate driving circuit 16 shown in FIG. 5 does not drive the gate lines of the display panel 20 during the active display periods TA2 and TA3, and the blanking periods TB2 and TB3, thereby reducing the power consumption and decreasing the temperature of the gate driving circuit 16.

It is noted that the time length from the active display period TA2 to the blanking periods TB3 may be a plurality of frame periods or display line periods.

Further, when detecting that the temperature of the source driving circuit 14 decreases to be lower than the second threshold temperature, the source driving circuit 14 transmits the temperature reduction control signal indicating the inactivation of the temperature reducing operation to the timing controller 12. In response to receiving the temperature reduction control signal indicating the inactivation of the temperature reducing operation, the timing controller 12 is configured to control the gate driving circuit 16 to enter a normal display state from an inactive state. For example, please further refer to FIG. 4 to FIG. 6. After detecting that the operating temperature TEMP of the source driving circuit 14 increases to be higher than a first threshold temperature OTP_on in the blanking period TB1, the source driving circuit 14 continues to monitor the temperature TEMP of the source driving circuit 14 as long as keeping receiving the over-temperature protection command signal OTP_CMD. It is noted that the over-temperature protection command signal OTP_CMD may be transmitted periodically by the timing controller 12 to the source driving circuit 14, and the source driving circuit 14 may keep detecting the operating temperature and determining whether over-temperature happens.

As shown in FIG. 6, the source driving circuit 14 detects that the operating temperature TEMP of the source driving circuit 14 decreases to be lower than a second threshold temperature OTP off. In response to detecting the temperature decreasing to be lower than the second threshold temperature OTP off, the source driving circuit 14 outputs a CRD signal with a thrice toggle to the timing controller 12 in the blanking period TB4 for informing the timing controller 12 of inactivation of the temperature reducing operation. In response to receiving the protection signal indicating the inactivation of the temperature reducing operation, the timing controller 12 shown in FIG. 4 transmits the output enable signal OE at the low voltage level (i.e. active voltage level) to the gate driving circuit 16 shown in FIG. 4 after the blanking period TB3. In another embodiment, in response to receiving the temperature reduction control signal indicating the inactivation of the temperature reducing operation, the timing controller 12 shown in FIG. 6 transmits the output enable signal OE at the low voltage level, or the gate clock signal GOP_CLK at the high voltage level, to the gate driving circuit 16 shown in FIG. 6 after the blanking period TB3. More precisely, the timing controller 12 starts transmitting the output enable signal OE at the low voltage level or the gate clock signal GOP_CLK at the high voltage level from a next frame period (TA4 and TB4) which is next to the frame period (TA3 and TB3) during which the CRD signal with thrice toggle is transmitted. Therefore, since the output enable signal OE is at the low voltage level, the gate driving circuit 16 shown in FIG. 4 changes to operate in a normal display state. Since the gate clock signal GOP_CLK is at the high voltage level, the gate driving circuit 16 shown in FIG. 6 changes to operate in a normal display state. As shown in FIG. 6, the output Gout of the gate driving circuit 16 represents the normal display after the blanking period TB3.

Figure 7:
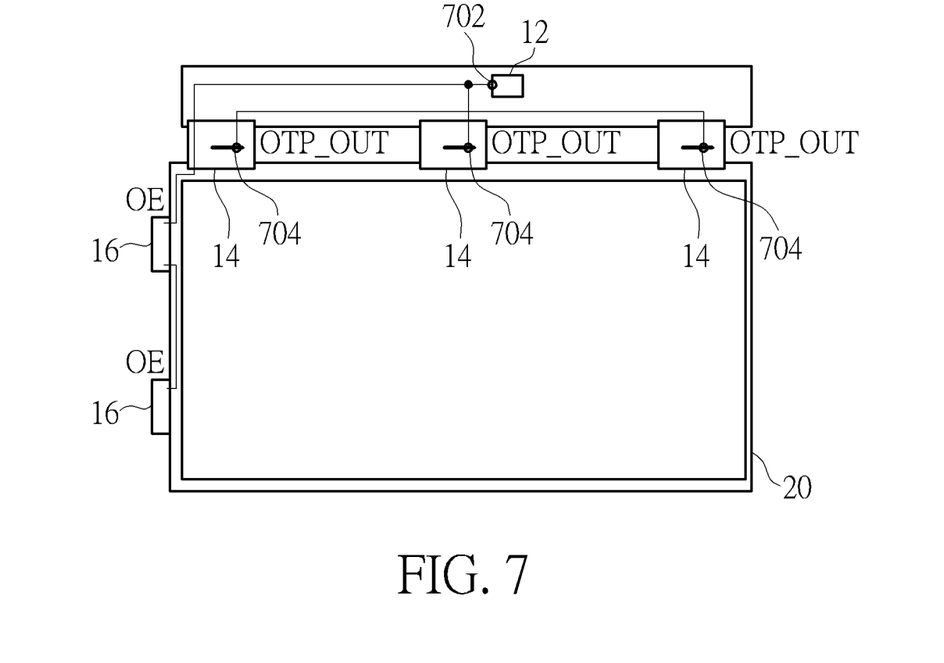
FIG. 7 is a schematic diagram illustrating the display system with the gate driving circuit in COF package according to another embodiment of the invention.
Figure 8:
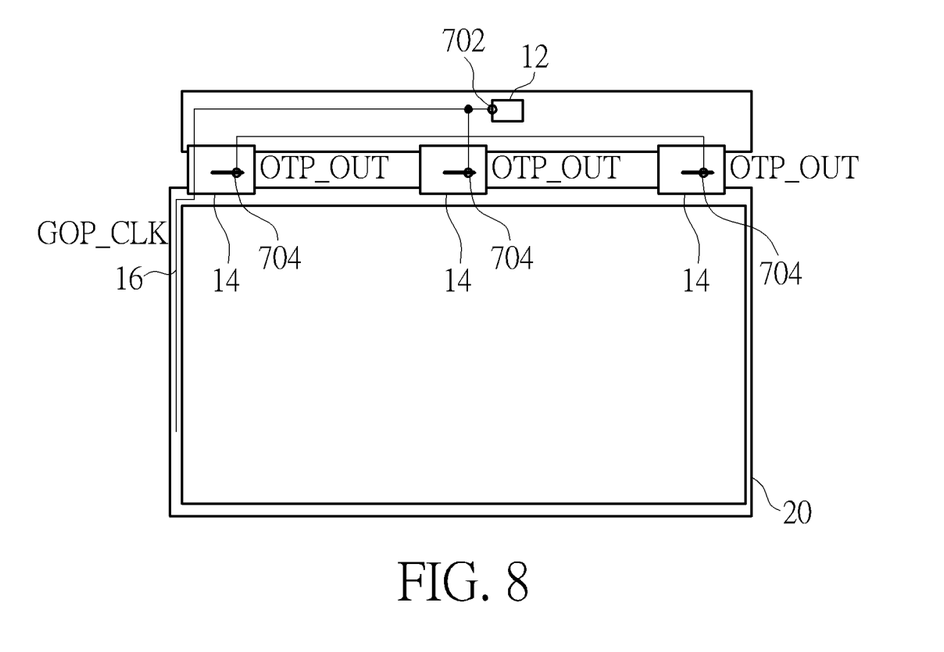
FIG. 8 is a schematic diagram illustrating the display system with the gate driving circuit as a GOA or COP circuit according to another embodiment of the invention.

In an alternative embodiment, please refer to FIG. 7 and FIG. 8. FIG. 7 shows the display system 1 with the gate driving circuit 16 in COF package according to another embodiment of the invention. FIG. 8 shows the display system 1 with the gate driving circuit 16 as a GOA (or GOP) circuit according to another embodiment of the invention. As shown in FIG. 7 and FIG. 8, the timing controller 12 includes an output node 702 for outputting a control signal (output enable signal OE or gate clock signal GOP_CLK) which indicates that the gate driving circuit 16 is active or inactive. The source driving circuit 14 is coupled to the display panel 20. The source driving circuit 14 includes an output node 704 for outputting a protection signal OTP out indicating an over-temperature detecting result. The output node 702 is electrically connected to the output node 704. The protection signal OTP out is capable of pulling the control signal to an inactive voltage level in response to that the source driving circuit 14 detects an operating temperature increases to be higher than a first threshold temperature, such that the gate driving circuit 16 becomes inactive. Moreover, the protection signal OTP out is capable of pulling the control signal to the inactive voltage level for lasting a preconfigured period which starts from a frame period or a display line period next to detecting the temperature increasing to be higher than the first threshold temperature.

Figure 9:
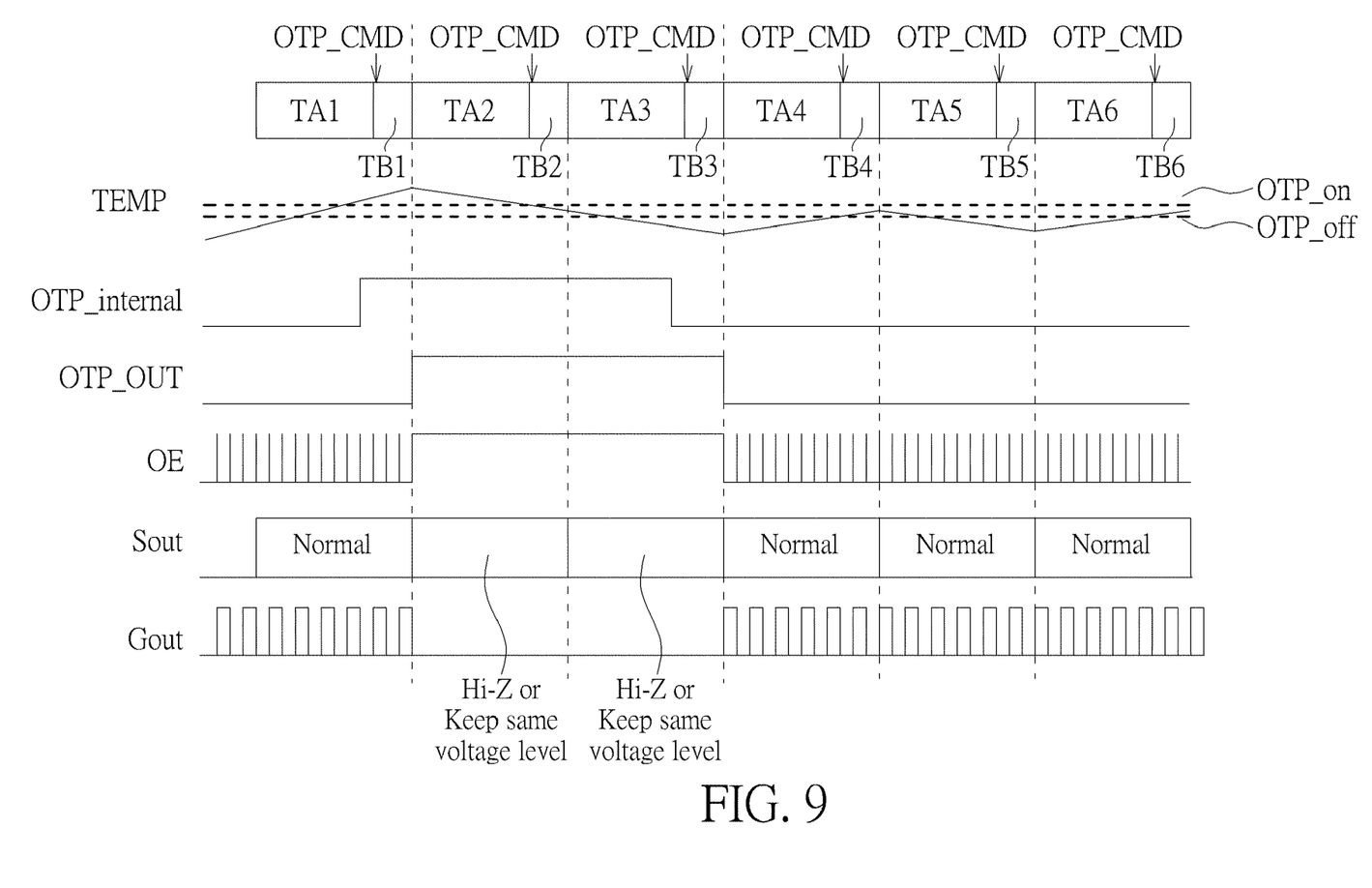
FIG. 9 is a waveform diagram of the display system shown in FIG. 1 and FIG. 7 according to an embodiment of the invention.

Please further refer FIG. 7 and FIG. 9. FIG. 9 is a waveform diagram of the display system 1 shown in FIG. 1 and FIG. 7 according to an embodiment of the invention. gate driving circuit 16As shown in FIG. 9, the output enable signal OE is low active. That is, an active voltage level of the output enable signal OE is the low voltage level and an inactive voltage level of the output enable signal OE is the high voltage level. As shown in FIG. 7 and FIG. 9, in response to receiving the over-temperature protection command signal OTP_CMD at the beginning of the blanking period TB1, the source driving circuit 14 enables the over-temperature protection operation. During the blanking period TB1, the source driving circuit 14 detects that an operating temperature TEMP of the source driving circuit 14 increases to be higher than a first threshold temperature OTP_on. In response to detecting the temperature TEMP increasing to be higher than the first threshold temperature OTP_on, the source driving circuit 14 controls the data output Sout of the source driving circuit 14 to stay in high impedance state or stay in data voltages of a currently displayed frame from the active display period TA2 to the blanking period TB3. Moreover, during the active display period TA1 and the blanking periods TB1, the output enable signal OE is at the low voltage level (i.e. active voltage level) and the protection signal OTP out is in a floating state. In response to detecting the temperature TEMP increasing to be higher than the first threshold temperature OTP_on, the source driving circuit 14 outputs the protection signal OTP out at the high voltage level during the active display periods TA2 and TA3, and the blanking periods TB2 and TB3. Since the output node 702 is electrically connected to the output node 704, the output enable signal OE is pulled to the high voltage level (i.e. inactive voltage level) by the protection signal OTP out during the active display periods TA2 and TA3, and the blanking periods TB2 and TB3. Therefore, the gate driving circuit 16 shown in FIG. 7 becomes inactive and does not output during the active display periods TA2 and TA3, and the blanking periods TB2 and TB3, thereby reducing the power consumption and decreasing the temperature of the gate driving circuit 16. During the active display periods TA3, the source driving circuit 14 detects that the operating temperature TEMP of the source driving circuit 14 decreases to be lower than a second threshold temperature OTP off. The source driving circuit 14 outputs the protection signal OTP out at low voltage level and the output enable signal OE is pulled to the low voltage level after the blanking period TB3. Therefore, the gate driving circuit 16 shown in FIG. 7 changes to operate in a normal display state and the output Gout of the gate driving circuit 16 represents the normal display after the blanking period TB3.

Figure 10:
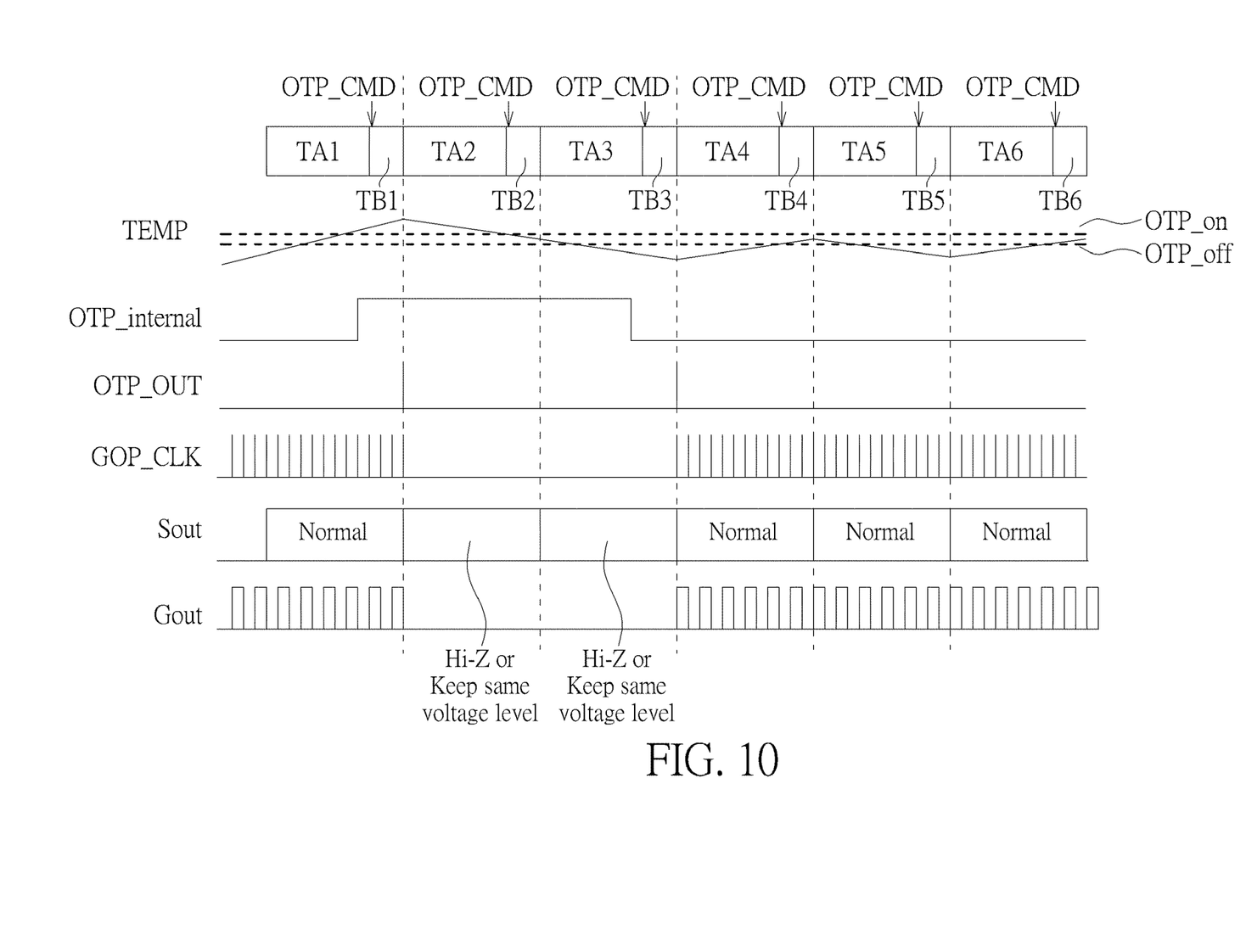
FIG. 10 is a waveform diagram of the display system shown in FIG. 1 and FIG. 8 according to an embodiment of the invention.

Please further refer FIG. 8 and FIG. 10. FIG. 10 is a waveform diagram of the display system 1 shown in FIG. 1 and FIG. 8 according to an embodiment of the invention. As shown in FIG. 10, the output enable signal OE is high active. That is, an active voltage level of the gate clock signal GOP_CLK is the high voltage level and an inactive voltage level of the gate clock signal GOP_CLK is the low voltage level. As shown in FIG. 8 and FIG. 10, in response to receiving the over-temperature protection command signal OTP_CMD at the beginning of the blanking period TB1, the source driving circuit 14 enables the over-temperature protection operation. During the blanking period TB1, the source driving circuit 14 detects that an operating temperature TEMP of the source driving circuit 14 increases to be higher than a first threshold temperature OTP_on. During the active display period TA1 and the blanking periods TB1, the gate clock signal GOP_CLK is at the high voltage level (i.e. active voltage level) and the protection signal OTP out is in a floating state. In response to detecting the temperature TEMP increasing to be higher than the first threshold temperature OTP_on, the source driving circuit 14 outputs the protection signal OTP out at the low voltage level during the active display periods TA2 and TA3, and the blanking periods TB2 and TB3. Since the output node 702 is electrically connected to the output node 704, the gate clock signal GOP_CLK is pulled to the low voltage level (i.e. inactive voltage level) by the protection signal OTP out which is pulled to the high voltage level during the active display periods TA2 and TA3, and the blanking periods TB2 and TB3. Therefore, the gate driving circuit 16 shown in FIG. 8 becomes inactive and does not output during the active display periods TA2 and TA3, and the blanking periods TB2 and TB3.

During the active display periods TA3, the source driving circuit 14 detects that the operating temperature TEMP of the source driving circuit 14 decreases to be lower than a second threshold temperature OTP off. The source driving circuit 14 outputs the protection signal OTP out in the floating state after the blanking period TB3. Therefore, the gate driving circuit 16 shown in FIG. 8 changes to operate in a normal display state and the output Gout of the gate driving circuit 16 represents the normal display after the blanking period TB3.

Figure 11:
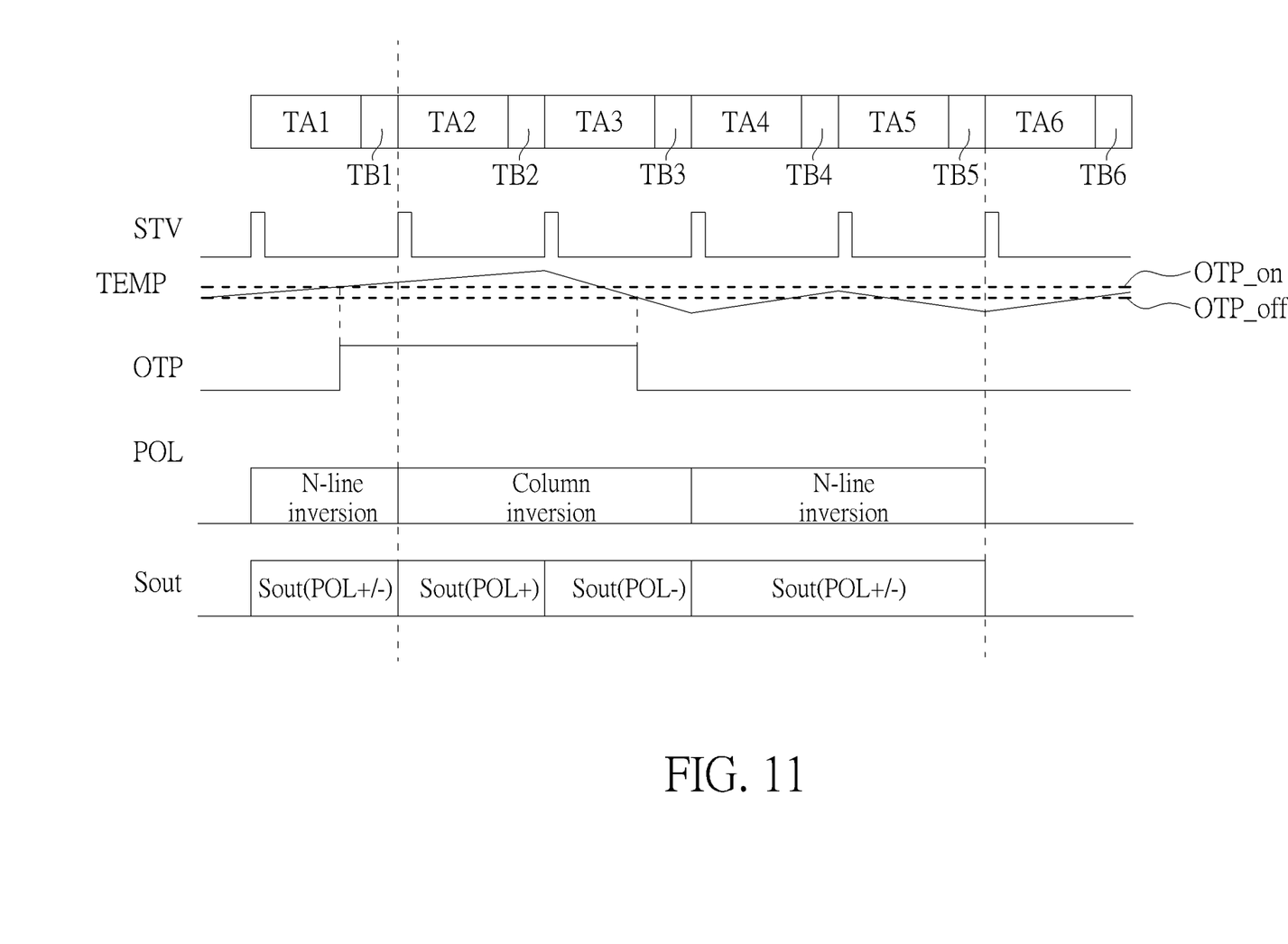
FIG. 11 is a waveform diagram illustrating the polarity inversion scheme of the display system shown in FIG. 1 and FIG. 3 according to an embodiment of the invention.

In an alternative embodiment, in response to receiving the protection signal indicating the activation of the temperature reducing operation, the timing controller 12 is configured to operate a temperature reducing operation. The timing controller 12 is configured to determine whether to change a first polarity inversion scheme which is currently applied by the timing controller 12 to a second polarity inversion scheme which makes the source driving circuit 14 have a lower power consumption. For example, please refer FIG. 3 and FIG. 11. FIG. 11 is a waveform diagram illustrating the polarity inversion scheme of the display system 1 shown in FIG. 1 and FIG. 3 according to an embodiment of the invention. If the first polarity inversion scheme is an n-line inversion method (e.g., 1 line inversion or 1+2 line inversion, 1+4 line inversion) and the second polarity inversion scheme is a column inversion method. For the N-line inversion method, polarity switching may occur frequently. For the column inversion method, since each data line has the same data polarity and the data polarities of two neighboring data lines are different, the number of polarity switching can be reduced significantly while employing the column inversion method. As such, the power consumption of employing the column inversion method by the display system 1 is less than the power consumption of employing the N-line inversion method by the display system 1. As shown in FIG. 11, N-line inversion method is applied by the timing controller 12 and the timing controller 12 outputs the polarity control signal POL for indicating the N-line inversion method during the active display period TA1 and the blanking period TB1.

During the active display periods TA1, the source driving circuit 14 detects that an operating temperature TEMP of the source driving circuit 14 increases higher than the first threshold temperature and outputs the protection signal OTP with the high voltage level for indicating the activation of the temperature reducing operation to the timing controller 12. In response to receiving the protection signal OTP indicating the activation of the temperature reducing operation, the timing controller 12 is configured to determine whether to change the N-line inversion method which is currently applied by the timing controller 12. The timing controller 12 decides to change the N-line inversion method to the column inversion method since the operating temperature TEMP of the source driving circuit 14 increases higher than the first threshold temperature and the column inversion method has lower power consumption than the N-line inversion method. As shown in FIG. 11, the timing controller 12 changes to apply the column inversion method and the timing controller 12 outputs the polarity control signal POL for indicating the column inversion method in the next frame period. The timing controller 12 applies the column inversion method during the active display periods TA2-TA3 and the blanking periods TB2-TB3, thereby reducing the output toggle, reducing the power consumption and decreasing the temperature of the source driving circuit 14.

Figure 12:
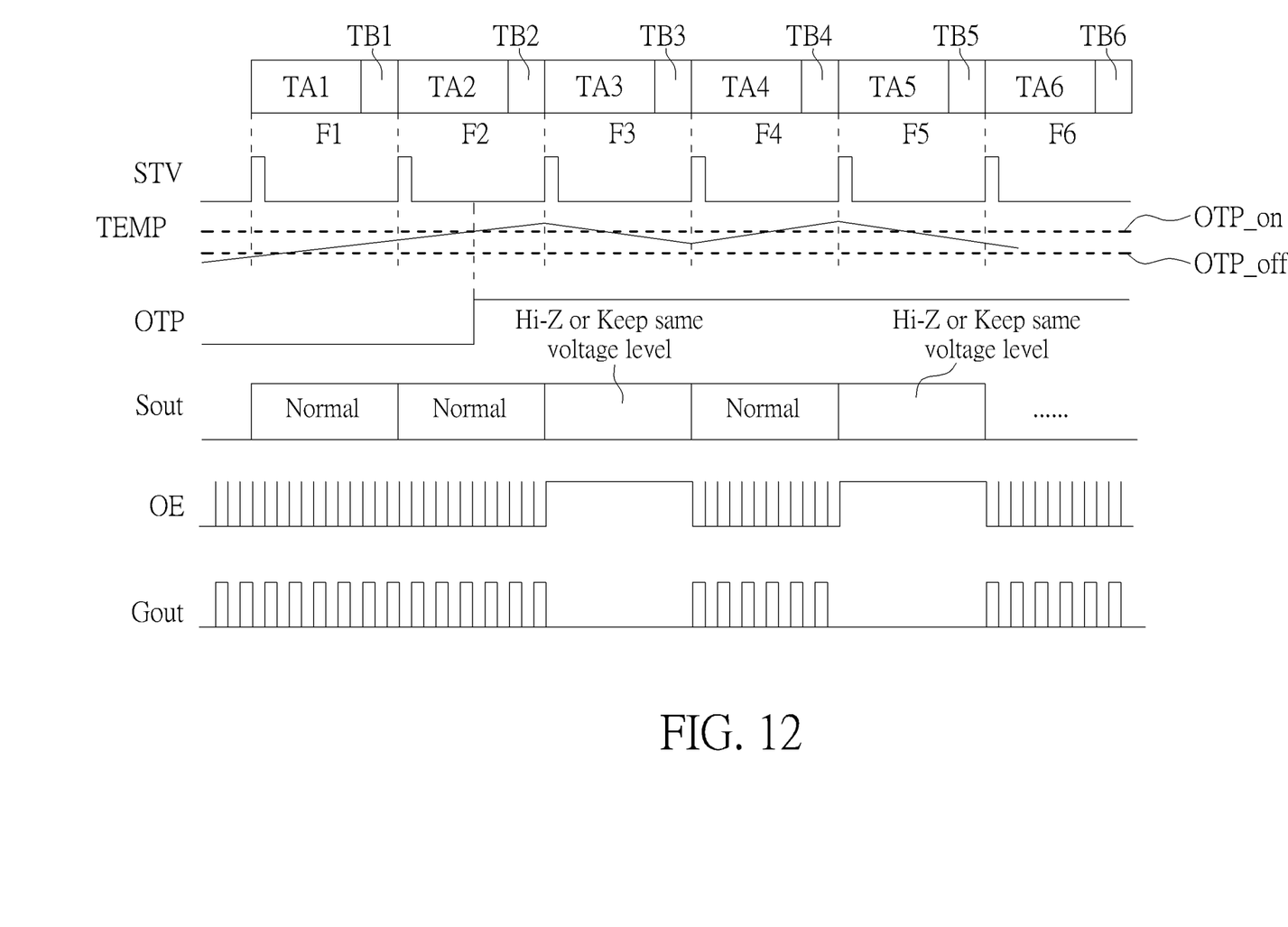
FIG. 12 is a waveform diagram illustrating the low frame rate function of the display system 1 shown in FIG. 4 according to an embodiment of the invention.

In an alternative embodiment, in response to receiving the protection signal indicating the activation of the temperature reducing operation, the timing controller 12 is configured to operate a temperature reducing operation. The timing controller 12 is configured to perform a low frame rate function, which means the timing controller 12 applies a lower frame rate for transmitting image data to the source driving circuit 14. The timing controller 12 controls the gate driving circuit 16 to not to output in part of the following frames next to detecting the temperature increasing to be higher than the first threshold temperature. Moreover, the source driving circuit 14 controls the data output Sout of the source driving circuit 14 to stay in high impedance state or stay in data voltages of a currently displayed frame in part of the following frames next to detecting the temperature increasing to be higher than the first threshold temperature. For example, please refer FIG. 3 and FIG. 12. FIG. 12 is a waveform diagram illustrating the low frame rate function of the display system 1 shown in FIG. 4 according to an embodiment of the invention. As shown in FIG. 12, during the active display period TA2, the source driving circuit 14 detects that an operating temperature TEMP of the source driving circuit 14 increases higher than the first threshold temperature and outputs a protection signal OTP indicating an over-temperature detecting result with the high voltage level for indicating the activation of the temperature reducing operation to the timing controller 12.

In response to receiving the protection signal OTP indicating the activation of the temperature reducing operation, the timing controller 12 is configured to perform a low frame rate function. As shown in FIG. 12, the timing controller 12 controls the gate driving circuit 16 to not to output in the frame period F3 and the frame period F5 (during the active display periods TA3 and TA5 and the blanking periods TB3 and TB5). The timing controller 12 outputs the output enable signal OE at the high voltage level (i.e. inactive voltage level) to the gate driving circuit 16 shown in FIG. 4 during the active display periods TA3 and TA5, and the blanking periods TB3 and TB5. Therefore, since the output enable signal OE is at the high voltage level, the gate driving circuit 16 shown in FIG. 4 does not output during the active display periods TA3 and TA5, and the blanking periods TB3 and TB5. As shown in FIG. 12, the output Gout of the gate driving circuit 16 is pulled to low level and the gate driving circuit 16 does not drive the gate lines of the display panel 20 during the active display periods TA3 and TA5, and the blanking periods TB3 and TB5. During the active display periods TA3 and TA5, and the blanking periods TB3 and TB5, the timing controller 12 can output a plurality of data of small swings to the source driving circuit 14, thereby reducing the power consumption and decreasing the temperature of the source driving circuit 14. In addition, the source driving circuit 14 can control the data output Sout of the source driving circuit 14 to stay in high impedance state or stay in data voltages of a currently displayed frame during the active display periods TA3 and TA5, and the blanking periods TB3 and TB5.

Figure 13:
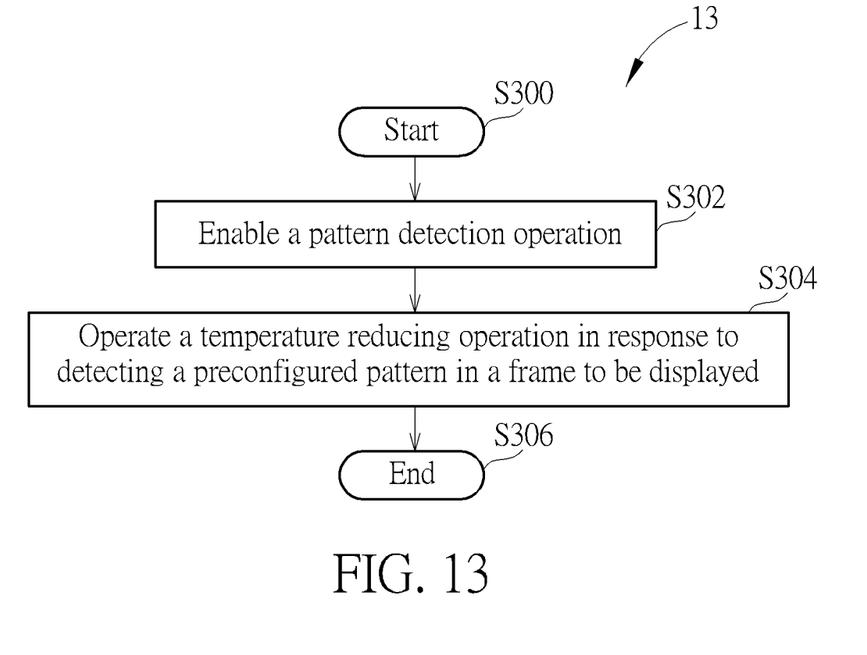
FIG. 13 is a flow diagram of a procedure according to another embodiment of the present invention.

Please refer to FIG. 13 which is a flow diagram of a procedure 13 according to an embodiment of the present invention. The procedure 13 can be applied to the display system 1 shown in FIG. 1. The procedure 13 at least includes the following steps:

Step S1300: Start.

Step S1302: Enable a pattern detection operation.

Step S1304: Operate a temperature reducing operation in response to detecting a preconfigured pattern in a frame to be displayed.

Step S1306: End.

Figure 14:
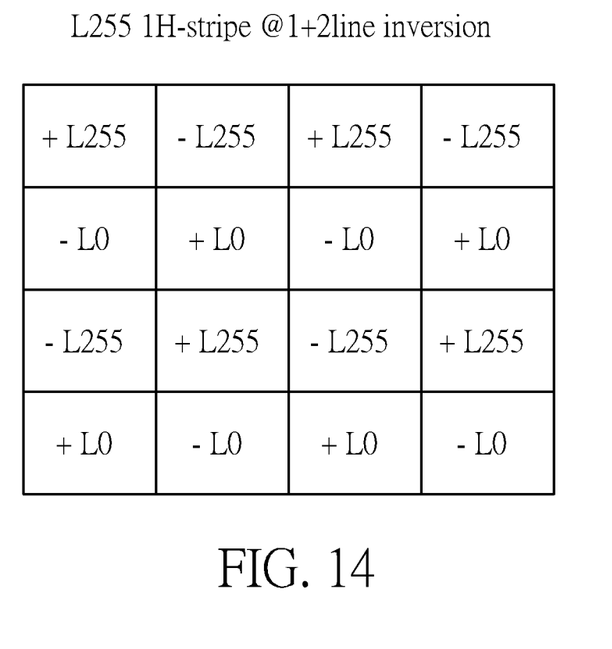
FIG. 14 is a schematic diagram illustrating a frame pattern of 1H-stripe with 1+2 line inversion.

According to the procedure 13, in Step S1302, the timing controller 12 can enable a pattern detection operation. The timing controller 12 detects whether a frame to be displayed includes a preconfigured pattern. The timing controller 12 compares the frame to be displayed with the preconfigured pattern. The timing controller 12 can compare gray levels of pixels of the frame to be displayed with the gray levels of pixels of the preconfigured pattern. The timing controller 12 can compare polarities of pixels of the frame to be displayed with the polarities of pixels of the preconfigured pattern. The timing controller 12 can utilize a pattern detection function (PDF) to detect whether a frame to be displayed includes a preconfigured pattern. The preconfigured pattern can be a heavy loading pattern. For example, the heavy loading pattern may be a frame pattern of L255 1H-stripe with column inversion or L255 1H-stripe with 1+2 line inversion, and this is not a limitation of the embodiment. FIG. 14 shows a frame pattern of 1H-stripe with 1+2 line inversion. As shown in FIG. 14, +/− represents the polarity of pixel of source driving circuit 14, Lx represents the gray voltage. The range of the gray voltage is between 0 and 255.

In addition, the source driving circuit 14 can also enable a pattern detection operation to determine whether that the preconfigured pattern is in the frame to be displayed according to the above mentioned method, and can operate a temperature reducing operation in response to detecting a preconfigured pattern in a frame to be displayed.

In Step S1304, in response to determining that the preconfigured pattern is in the frame to be displayed, a temperature reducing operation can be performed. When the source driving circuit 14 enables the pattern detection operation and determines that the preconfigured pattern is in the frame to be displayed in Step S1302, the source driving circuit 14 can control a plurality of data output nodes to stay in a first state in response to determining that the preconfigured pattern is in the frame to be displayed in Step S1304. The first state is a high impedance state, or data voltages of a currently displayed frame. Alternatively, when the timing controller 12 enables the pattern detection operation and determines that the preconfigured pattern is in the frame to be displayed in Step S1302, the timing controller 12 can transmit a command signal to inform the activation of the temperature reducing operation. In response to the command signal, the source driving circuit can control a plurality of data output nodes to stay in the first state.

Moreover, in response to determining that the preconfigured pattern is in the frame to be displayed, the timing controller 12 is configured to operate a temperature reducing operation. Different temperature reducing operations are provided as follows. In an embodiment, the timing controller 12 is configured to control the gate driving circuit 16 to not to output during a plurality of frame periods. In another embodiment, in response to determining that the preconfigured pattern is in the frame to be displayed, the timing controller 12 is configured to perform a low frame rate function. In still another embodiment, in response to determining that the preconfigured pattern is in the frame to be displayed, the timing controller 12 is configured to determine whether to change a first polarity inversion scheme which is currently applied by the timing controller 12 to a second polarity inversion scheme which makes the source driving circuit 14 have a lower power consumption.

Figure 15:
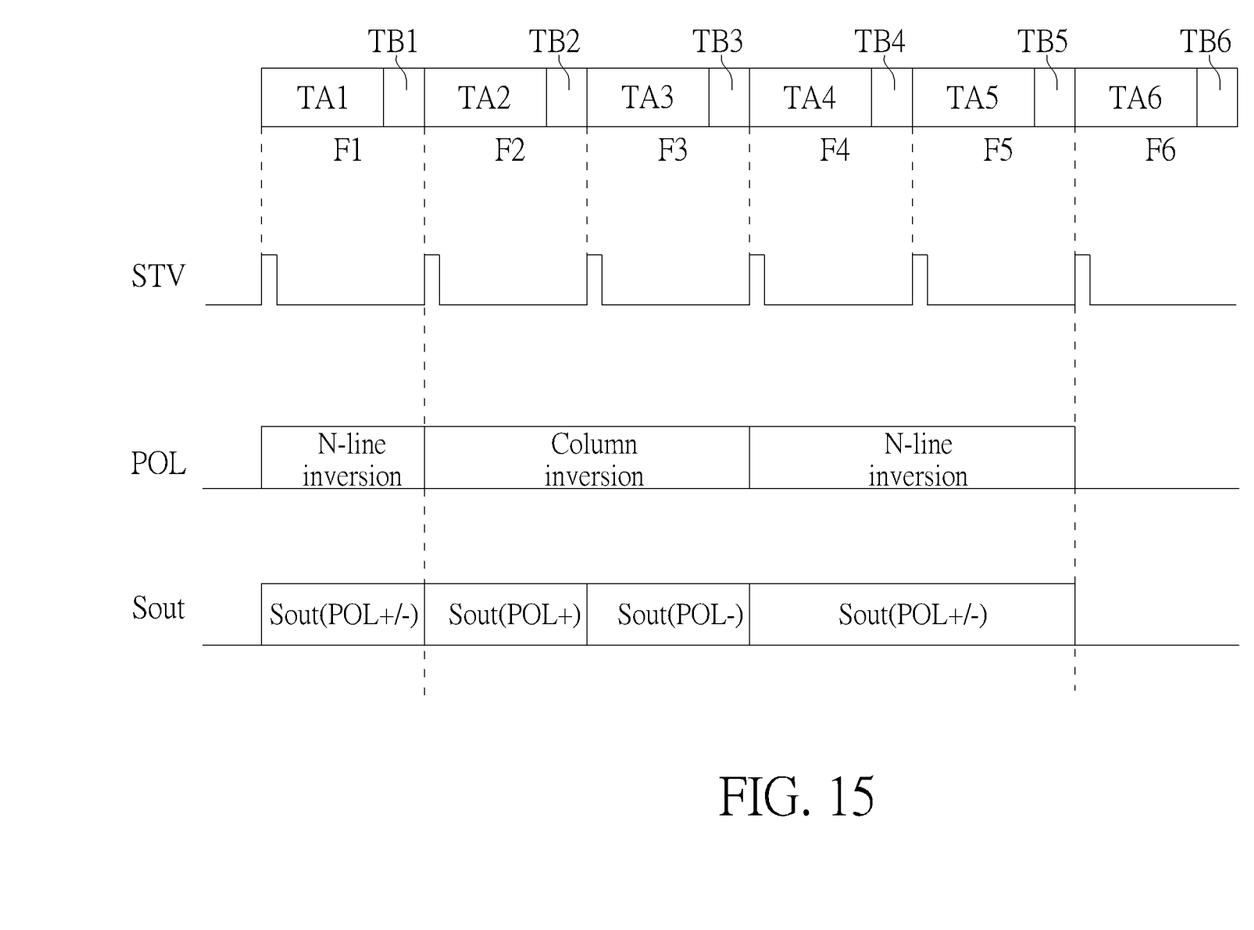
FIG. 15 is a waveform diagram illustrating the polarity inversion scheme of the display system according to another embodiment of the invention.

For example, please refer FIG. 15. FIG. 15 is a waveform diagram illustrating the polarity inversion scheme of the display system 1 shown in FIG. 1 and FIG. 3 according to another embodiment of the invention. If the first polarity inversion scheme is an n-line inversion method (e.g., 1 line inversion or 1+2 line inversion, 1+4 line inversion) and the second polarity inversion scheme is a column inversion method. Suppose the preconfigured pattern is a heavy loading pattern. During the active display period TA1, the N-line inversion method is applied by the timing controller 12, and the timing controller 12 outputs the polarity control signal POL for indicating the N-line inversion method during the active display period TA1 and the blanking period TB1. During the active display period TA1, the source driving circuit 14 detect that image frames of both of the frame periods F1 and F2 include heavy loading pattern and accordingly inform the timing controller 12. The timing controller 12 decides to change the N-line inversion method to the column inversion method since the frames of the frame periods F1 and F2 include heavy loading pattern and the column inversion method has lower power consumption than the N-line inversion method. As shown in FIG. 15, the timing controller changes to apply the column inversion method and the timing controller 12 outputs the polarity control signal POL for indicating the column inversion method during the active display periods TA2-TA3 and the blanking periods TB2-TB3 (i.e., frame periods from F2 to F3). The timing controller 12 applies the column inversion method during the active display periods TA2-TA3 and the blanking periods TB2-TB3, thereby reducing the output toggle, reducing the power consumption and decreasing the temperature of the source driving circuit 14.

In summary, the embodiments provide the temperature reducing operation based on enabling the over-temperature protection operation or the pattern detection operation, so as to reduce the power consumption, decrease the temperature of driving device 10 and prevent damages to the display system 1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reducing operating temperature of a source driving circuit, the method comprising:
   enabling a pattern detection operation; and
   operating a temperature reducing operation in response to detecting a preconfigured pattern in a frame to be displayed, wherein the step of operating the temperature reducing operation comprises:
      transmitting, by a timing controller, a first signal to the source driving circuit in response to detecting the preconfigured pattern;
      controlling, by the source driving circuit, a plurality of data output nodes to stay in a first state in response to receiving the first signal, wherein the first state is a high impedance state or data voltages of a currently displayed frame; and
      transmitting, by the timing controller, the first signal to the source driving circuit after a preconfigured period from detecting the preconfigured pattern, such that the source driving circuit returns to a normal display state from an inactive state in response to receiving the first signal.

2. The method of claim 1, wherein the temperature reducing operation comprises:
controlling, by a timing controller, a gate driving circuit to not to output during a plurality of frame periods, by setting an output enable signal or a gate clock signal to be inactive.

3. A display system, comprising:
a display panel;
a source driving circuit, coupled to the display panel and comprising a first output node for outputting a first signal indicating an over-temperature detecting result;
a gate driving circuit; and
a timing controller, comprising a second output node for outputting a control signal which indicates the gate driving circuit is active or inactive;
wherein the first output node is electrically connected to the second output node and the first signal is capable of pulling the control signal to an inactive voltage level without performing a logical operation in response to that the source driving circuit detects an operating temperature increasing to be higher than a first threshold temperature, such that the gate driving circuit becomes inactive.

4. The display system of claim 3, wherein the source driving circuit is configured to control the plurality of data output nodes to stay in a first state in response to detecting the temperature increasing to be higher than the first threshold temperature.

5. The display system of claim 4, wherein the source driving circuit controls the plurality of data output nodes to stay in the first state for a preconfigured periods which starts from a frame period or a display line period next to detecting the temperature increasing to be higher than the first threshold, or, to stay in the first state until a frame period or a display line period next to detecting the temperature decreasing to be lower than a second threshold temperature.

6. The display system of claim 3, wherein the first signal is capable of pulling the control signal to the inactive voltage level for lasting a preconfigured period which starts from a frame period or a display line period next to detecting the temperature increasing to be higher than the first threshold.

* * * * *